Jan. 4, 1966     W. B. PARKER     3,227,231
WEIGHING APPARATUS
Filed Jan. 22, 1964     2 Sheets-Sheet 1
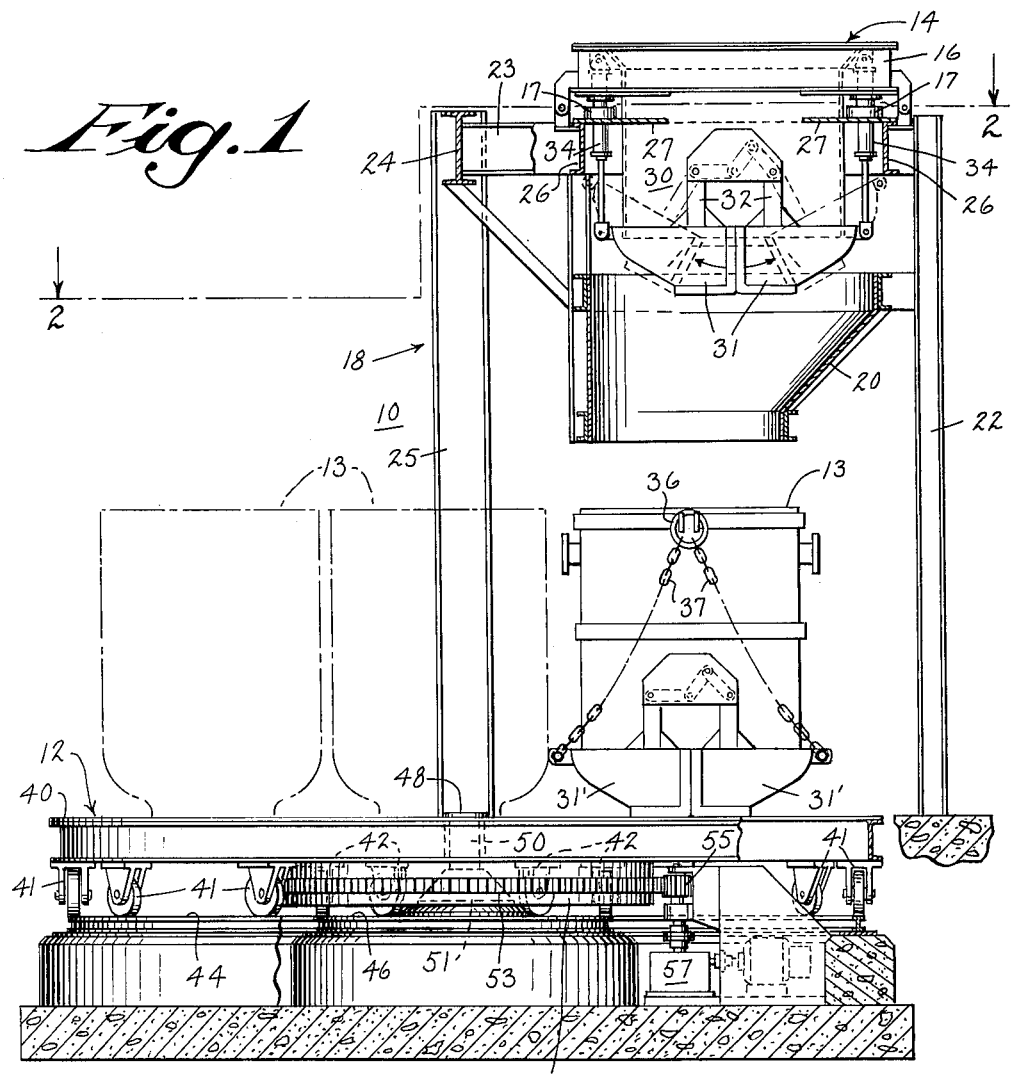
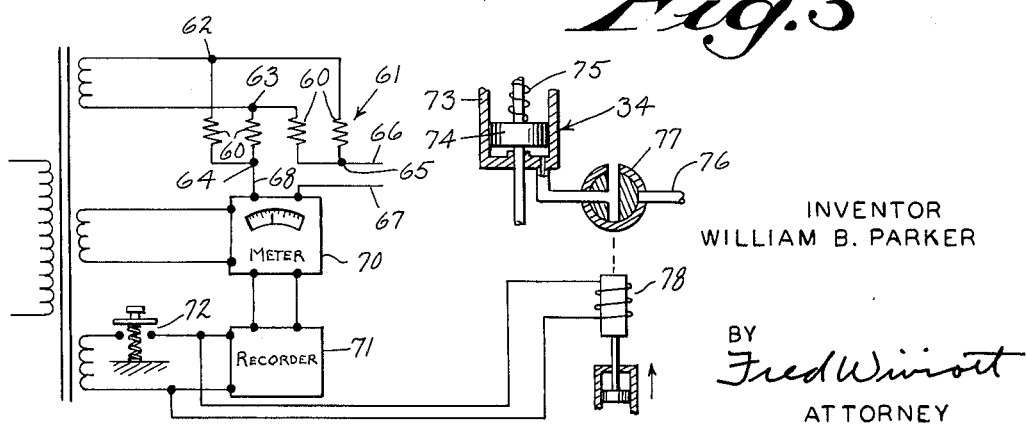
INVENTOR
WILLIAM B. PARKER
BY Fred Winiott
ATTORNEY Jan. 4, 1966 W. B. PARKER 3,227,231
WEIGHING APPARATUS
Filed Jan. 22, 1964 2 Sheets-Sheet 2

INVENTOR
WILLIAM B. PARKER

BY
Fred Winiott
ATTORNEY

United States Patent Office

3,227,231
Patented Jan. 4, 1966

3,227,231
WEIGHING APPARATUS
William B. Parker, Pittsburgh, Pa., assignor to McGraw-Edison Company, Milwaukee, Wis., a corporation of Delaware
Filed Jan. 22, 1964, Ser. No. 339,367
3 Claims. (Cl. 177—2)

This invention relates to apparatus for weighing the charge for a metal melting furnace and for conveying the charge before and after the weighing operation.

It is common practice in the melting of scrap steel to transport the scrap metal to be melted to the furnace area by means of a charging bucket whereupon the contents of the bucket may be discharged into the furnace. In order to determine the quantity of scrap metal charged into any given furnace, the charging buckets are first loaded in the scrap area, transported to a weighing station, unloaded from the conveying apparatus and weighed, reloaded on the conveying apparatus and then transported to the furnace area.

It is an object of the invention to provide new and improved apparatus for weighing and conveying furnace charge from the scrap area to the furnace area.

Another object of the invention is to provide conveying means for transporting a furnace charging bucket in a circuitous path between a furnace area and a scrap area, container means mounted above said container at the scrap area, load cell means supporting the container and means for discharging the container into the furnace charging bucket. According to a more specific object of the invention, weight recording means are coupled to the load cells and interlocked with the discharging means so that the material in the container cannot be discharged until its weight is recorded.

These and other objects and advantages of the instant invention will become more apparent from the detailed description thereof taken with the accompanying drawings in which:

FIG. 1 is a side elevational view, with parts broken away, of the apparatus according to the instant invention;

Figure 2:
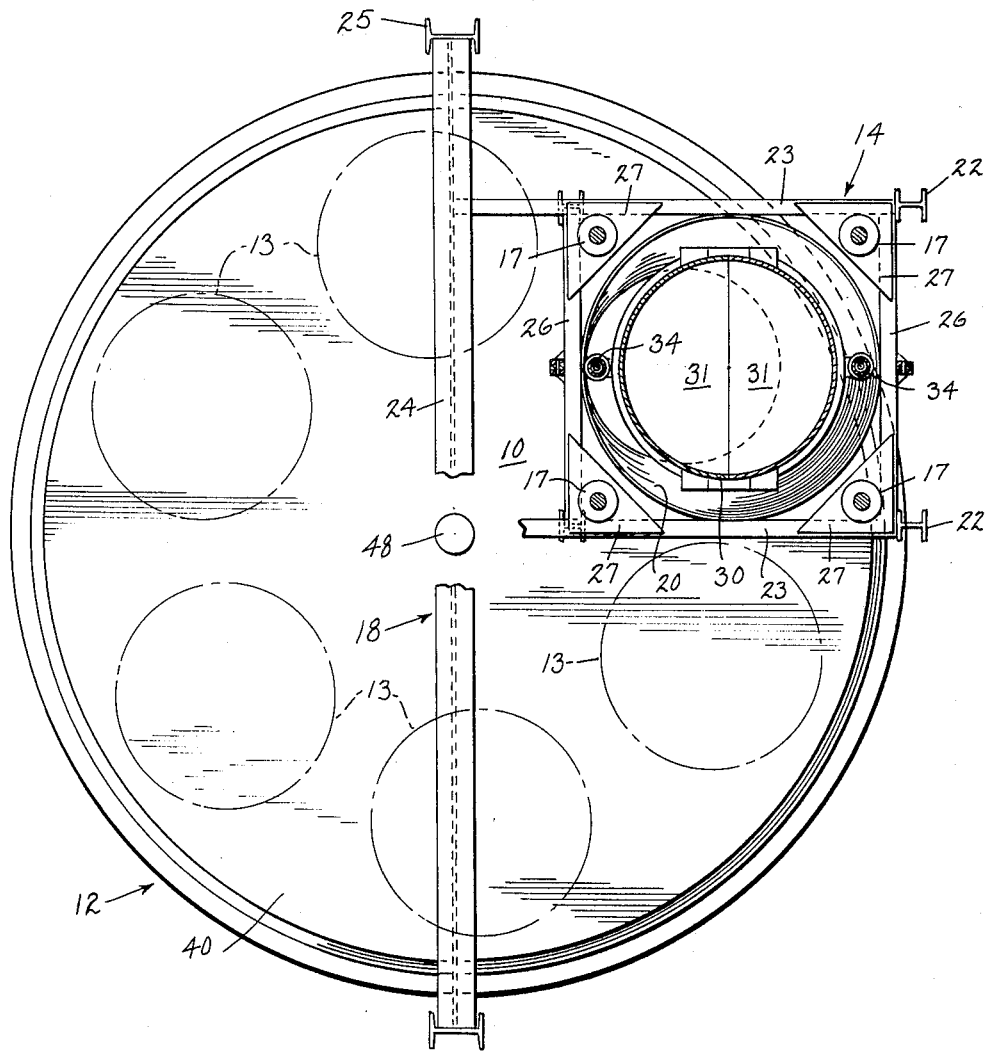
FIG. 2 is a view taken along lines 2—2 of FIG. 1.

FIG. 3 schematically illustrates a portion of the instant invention.

Referring to the drawings in greater detail, FIG. 1 shows the apparatus according to the instant invention to include a weighing station 10 and a conveyor 12 for transporting furnace charging buckets 13 between the scrap area, the weighing station and the furnace area.

The weighing station 10 includes a pneumatically operated clam shell bucket 14 having a frame 16 carried on four load cells 17 which are mounted on a support frame 18. A tapered chute 20 is mounted on the support frame 18 below the bucket 14 for directing material discharged from the latter into the furnace charging bucket 13 disposed therebelow on the conveyer 12.

The frame 18 includes a pair of vertical column members 22 extending upwardly from the plant floor and generally to one side of the conveyer 12. A pair of cross members 23 extend from the upper ends of the columns 22 to a beam member 24 which spans the conveyor 12 and is carried at the upper end of a second pair of column members 25 which are disposed in substantially the opposite sides of the conveyer 12. A pair of tie members 26 extend between the cross members 23 and form therewith, a substantially rectangular support for the bucket 14. A rectangular plate 27 is affixed at each of the corners of the rectangular support formed by the cross pieces 23 and the tying members 26 and each supports one of the load cells 17. Thus, the load cells 17 provide a four-point suspension for the clam shell bucket 14.

It will be understood by those skilled in the art that the various members which comprise the frame 18 are fastened in any suitable manner, such as by welding.

The clam shell bucket 14 is of a type well-known in the art and includes a cylindrical body portion 30 which is open at both ends and a pair of bottom closure members 31 which are each carried at the lower end of a pair of arms 32, only one of which is seen in FIG. 1, and each of which is pivotally supported at its upper end on the body portion 30. A pneumatic cylinder assembly 34 is connected to the outer end of each of the closure portions 31. Operation of the cylinders 34 draws the outer ends of the bottom closure members from their full positions in FIG. 1 to their dotted positions as the arms 32 pivot in opposite directions to discharge the contents of the bucket 14 into the chute 20. The charging bucket 13 may also be of the clam shell type except that instead of pivoting the bottom closure portions 31' by a pneumatic cylinder, this is accomplished by pulling upwardly on a ring 36 which is connected to the upper end of a pair of chains 37, the lower ends of which are connected to the outer ends of closure members 31'.

The conveyer 12 consists of a generally circular metallic turntable 40 which is supported by a first plurality of wheel carriages 41 affixed in spaced relation to its underside and around its periphery and a second plurality of wheel carriages 42 disposed in spaced circular array under its central portion. Each of the carriages 41 rides on a large diameter circular track 44 suitably supported on concrete footings and the second plurality of carriages 42 ride on a second circular track 46 which is smaller in diameter and concentric with the track 44.

The turntable 40 has a central bushing 8 which engages a vertical shaft 50 suitably mounted on a support column 51. A ring gear 53 is carried coaxially around the support column 51 by a circular channel member 54 suitably affixed to the underside of the turntable 40. A pinion 55 meshes with the gear 53 and is driven by a motor 56 through a speed-reducing mechanism 57 to rotate the turntable 40 about the shaft 50.

With reference to FIG. 2, the assembly is arranged so that the right side of the drawing corresponds to the scrap area of the plant, while the left side corresponds to the furnace area. The scrap metal to be melted is brought from the scrap area and deposited in the charging bucket 14 where its weight is registered by the load cells 17. The scrap is then discharged from the weighing bucket 14 to the furnace-charging bucket 13 and then the turntable assembly 12 is rotated to move the charging bucket 13 from beneath the weighing bucket 14 and a second charging bucket into its place. The charging buckets 13 are then successively filled and moved toward the left side of the turntable as viewed in FIG. 2. When the full charging bucket reaches the furnace side of the turntable assembly 12, it is removed and its contents discharged into a furnace and an empty charging bucket is put in its place, so that the procedure may be continuous.

The load cells 17 maybe of any well-known type which produces an output signal proportional to an applied load. An example is the bonded wire strain gage type illustrated in FIG. 3 to include four bonded wire strain gages 60 which are connected to form a bridge circuit 61. The strain gages 60 are mounted on a load receiving column of the load cell 17 and a constant potential is applied across terminals 62 and 63 of the bridge 61. Deformation of the load receiving column upon the application of a load thereto results in an output signal at terminals 64 and 65 of bridge 61 which is a function of the applied load. In order to totalize the weight of material in the bucket 14, conductors 66, 67 and 68 connect the bridge circuits of all of the load cells 17 in series with each other and to a meter 70. A recorder 71 is connected to the meter for receiving a signal functionally related to the weight of material in bucket 14. The recorder 71 is electroresponsive and is actuated by closing a switch 72.

The pneumatic cylinder assembly 34 is shown in FIG. 3 to include a cylinder 73 containing a piston 74 which is urged toward its lower end by a spring 75. A conduit 76 connects the lower end of cylinder 73 to a pressure source (not shown) through a three-way valve 77 operated by a solenoid 78. When the solenoid 78 is de-energized as shown in FIG. 3, the lower end of the cylinder 73 will be exhausted and the bottom closure portions 31 of bucket 14 (see FIG. 1) will be closed. When the solenoid is energized, the lower end of the cylinder 73 will be connected to the pressure source (not shown) so that the piston 74 will be driven upwardly and the contents of the bucket 14 discharged.

The solenoid 78 is shown connected in parallel with the recorder 71 so that the contents of the bucket 14 cannot discharge unless the recorded is actuated. The solenoid 78 may be slightly time delayed to enable the recording function to be completed before the bottom closure portions 31 are opened.

While only a single embodiment of the invention has been shown and described, it is not intended to be limited thereby but only by the scope of the appended claims.

I claim:

1. In combination, a conveying device for transporting a furnace charging bucket in a circuitous path from a furnace area to a scrap area, a support frame having a portion overhanging the scrap area side of said conveying device, a plurality of load cells mounted on said frame portion, a container mounted on said load cells so that the contents of said container may be weighed, motive means for said conveying device and being operative to move said charging bucket into and out of a position below said container, electroresponsive weight recording means coupled to said load cells, electromotive means for discharging the contents of said container into said furnace charging bucket disposed therebelow, circuit means coupling said electroresponsive weight recording means to said electromotive means, said circuit means being operative to simultaneously actuate said weight recording means and said electromotive means so that the weight of the contents in said container is recorded simultaneously with the commencement of the discharging thereof.

2. In combination, a rotatably mounted circular platform for transporting a furnace charging bucket in a circular path from a furnace area to a scrap area, a support frame having a portion overhanging said platform adjacent the scrap area side thereof, a plurality of load cells mounted on said frame portion, a container mounted on said load cells so that the contents of said container may be weighed, electroresponsive weight recording means, motive means for rotating said platform to move said charging bucket into and out of a position below said container, said container having a bottom closure portion, electromotive means for opening said closure portion to discharge the contents of said container into said furnace charging bucket disposed therebelow, circuit means coupling said electroresponsive weight recording means to said electromotive means, said circuit means being operative to simultaneously actuate said weight recording means and said electromotive means so that the weight of the contents of said container is recorded simultaneously with the commencement of the discharging thereof.

3. In combination, a rotatably mounted circular platform for transporting a plurality of furnace charging buckets in a circular path from a scrap area to a furnace area, a support frame having a portion overhanging said platform adjacent the scrap area side thereof, a plurality of load cells mounted on said frame and constructed and arranged to modify an electrical quantity in accordance with the load applied thereto, a container mounted on said load cells so that the contents of said container may be weighed, electroresponsive weight recording means connected to said load cells and responsive to said electric quantity for providing a weight record when actuated in accordance with said electric quantity, motive means for rotating said platform about a vertical axis to sequentially move said charging buckets into and out of a position below said container, said container having a bottom closure portion, electromotive means for opening said enclosure portion to discharge the contents of said container into the furnace charging buckets disposed therebelow, circuit means connecting said electroresopnsive weight recording means in a parallel relation with said electromotive means, said circuit means being operable to simultaneously couple said weight recording means and said electromotive means to an energizing source so that the contents of said container is weighed simultaneously with the commencement of the discharging thereof.

References Cited by the Examiner

UNITED STATES PATENTS

| | | | |
|---|---|---|---|
| 1,787,287 | 12/1930 | Schellentrager | 177—62 X |
| 2,213,982 | 9/1940 | Frey et al. | 177—211 |
| 2,871,005 | 1/1959 | Bourassa | 177—17 |
| 2,932,501 | 4/1960 | Hicks | 177—210 X |

FOREIGN PATENTS 296,060    1/1917    Germany.

LEO SMILOW, *Primary Examiner.*